United States Patent [19]

Bybee et al.

[11] 4,086,486
[45] Apr. 25, 1978

[54] ONE DIMENSIONAL PHOTON-COUNTING DETECTOR ARRAY

[76] Inventors: Richard Lee Bybee, 955 McIntire, Boulder, Colo. 80303; John G. Timothy, 85 E. India Row, Boston, Mass. 02110

[21] Appl. No.: 693,954

[22] Filed: Jun. 8, 1976

[51] Int. Cl.² .............................................. H01J 39/12
[52] U.S. Cl. ................................... 250/207; 313/104; 250/213 VT
[58] Field of Search ........................ 250/207, 213 VT; 313/103, 104, 105

[56] References Cited

U.S. PATENT DOCUMENTS

| 3,374,380 | 3/1968 | Goodrich | 313/104 |
| 3,676,676 | 7/1972 | Somer | 250/207 X |
| 3,887,810 | 6/1975 | Skaggs | 250/213 UX |

OTHER PUBLICATIONS

One-Dimensional Photon-Counting Detector Array for Use at EUV and Soft X-ray Wavelengths., J. G. Timothy & R. L. Bybee, applied Optics, vol. 14, No. 7, Jul. 1975, pp. 1632–1644.

Primary Examiner—David C. Nelms
Assistant Examiner—Vincent J. Sunderdick
Attorney, Agent, or Firm—James D. Haynes

[57] ABSTRACT

A photon-counting detector array utilizes a one-dimensional multiple element anode array is in proximity focus to the last plate of the microchannel array for collecting the electrons generated therein. A specific embodiment has 64 anode elements. A detector system is provided with separate charge amplifiers, and level discriminators for each anode element. The discriminator outputs can be serially read out to a digital computer. Alternatively or additionally, the discriminator outputs are accumulated in counters, and display electronics are provided which can include digital-to-analog converters for forming a display representative of the counts accumulated in each counter, and the total count accumulated in all the counters.

5 Claims, 4 Drawing Figures

ONE DIMENSIONAL PHOTON-COUNTING DETECTOR ARRAY

BACKGROUND OF THE INVENTION

This invention pertains to a one-dimensional photon-counting detector array and in particular to such an array utilizing microchannel array plates and a multiple element anode.

Instruments for photometric studies at ultraviolet and x-ray wavelengths have traditionally been divided into two distinct classes: photographic and photoelectric. Photographic instruments, employing film as the detection system, have the great advantage of an image-storing capability. It is therefore possible to use this type of instrument to record a very large amount of data with a single exposure. However, photographic film has a number of major disadvantages. First, the sensitivity is considerably lower than that of a photoelectric detector; at ultraviolet wavelengths, where special emulsions are required, the quantum efficiency is typically about 1% that of a photoelectric detector. Second, the response is nonlinear as a function of the incident energy. Hence, photometric calibration is a difficult and time-consuming procedure, and the resulting accuracy is poor. Furthermore, the emulsion is sensitive to a very wide range of wavelengths; accordingly, the elimination of background fog levels is extremely difficult. Finally, the output signal is not electrical in character. The use of photographic film in space experiments on orbiting satellites thus implies either recovery of the film or a complex onboard processing and video transmission system.

Photoelectric instruments, on the other hand, are more sensitive, have a greater stability of response, and provide a linear output as a function of the incident energy. The output data format is also fully compatible with spacecraft data-handling and telemetry systems. However, since most photoelectric detectors do not have image-recording capabilities, the data must be read out sequentially, point-by-point. Consequently, the overall speed of the system is quite slow.

The SEC vidicon tube has been used extensively on sounding rockets and orbiting satellites to combine some of the advantages of both the photographic and the photoelectric detection techniques. Although this device has an image-recording capability and an electrical readout, it has major limitations in terms of dynamic range, stability of response, resolution, and photometric accuracy.

The development of the channel electron multiplier and its miniaturization into the microchannel array plate have been important developments in the field of photometrics, combining the advantages of both the photographic and the photoelectric detection systems. The microchannel array plate can be operated as an image intensifier and has the potential of being developed to yield signal outputs superior to those of conventional photomultipliers. In particular, the microchannel array plate has a photon-counting capability and a negligible dark count rate. These devices can operate stably and efficiently at extreme ultraviolet (EUV) and soft x-ray wavelengths in a windowless configuration or can be installed with a photocathode in a sealed tube for use at ultraviolet and visible wavelengths.

The readout systems generally employed with microchannel array plates in the prior art has been a visible-light phospor coupled to either a vidicon tube or photographic film. In this arrangement, the detected photon is converted to a pulse of electrons in the microchannel; these electrons are accelerated toward the phosphor and reconverted to visible photons, which are detected by either the vidicon photocathode or the photographic emulsion. Although the microchannel array plate can provide a gain on the order of $10^7$, this system is cumbersome and has all the inherent disadvantages of either the photographic plate or the vidicon tube.

In order to exploit the full sensitivity, dynamic range and photometric stability of the microchannel array plate, it is necessary to employ pulse-counting readout systems working directly at the anode. Some examples of pulse-counting systems to read out spatial information from microchannel array plates have been described in the prior art, but have been designed to employ a limited number of amplifiers, two for a one-dimensional array and four for a two-dimensional array, and have consequently been limited in terms of dynamic range and spatial resolution. This is especially the case for applications at high signal levels such as from laboratory EUV and soft x-ray sources or from telescopes for solar studies at EUV and soft x-ray wavelengths. While there is a suggestion of a multielement anode array in "The Multianode Photomultiplier", by Catchpole and Johnson, Pub. Astron. Soc. Pacific, Volume 84, February 1972, pages 134–136, there is no disclosure of any parameters for such a construction, nor of any data handling construction. In accordance with the present invention it has been found that a practical and workable multielement anode array can only be arrived at by careful control of the parameters, as fully discussed hereinafter.

OBJECTS AND SUMMARY OF THE INVENTION

Accordingly, it is an object of this invention to provide a photon-counting detector utilizing a microchannel array plate or plates and a multielement anode having a high detection efficiency and a high degree of spatial resolution.

Briefly, in accordance with one embodiment of the invention, a plurality of adjacent microchannel array plates are provided, each of which has microchannels disposed at an angle with respect to microchannels of each adjacent plate. An anode array includes a plurality of separate anode elements and is disposed in a plane parallel to the innermost microchannel array plate and spaced therefrom by a predetermined distance. Amplifier and discriminator means are connected to each anode element for developing output pulses representative of the charge accumulated by each anode element.

BRIEF DESCRIPTION OF THE DRAWINGS

Other objects and advantages of the invention will appear from the following detailed description taken in conjunction with the accompanying drawings, wherein.

DETAILED DESCRIPTION

Figure 1:
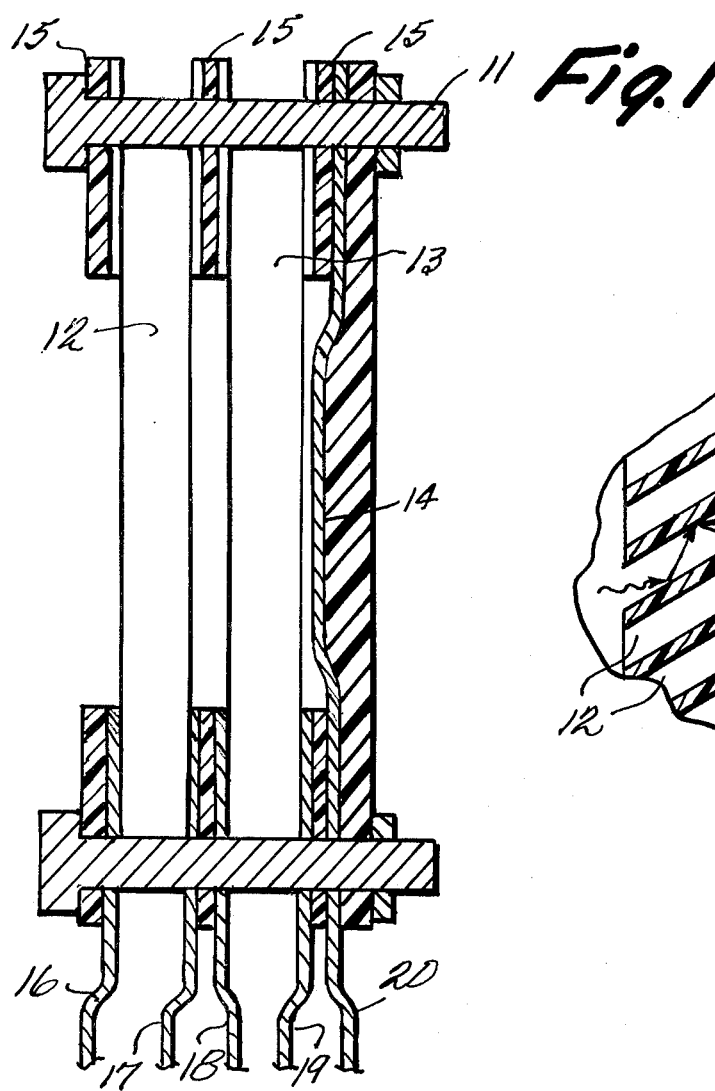
FIG. 1 is a cross section of a detector array employing cascaded microchannel array plates.
Figure 2:
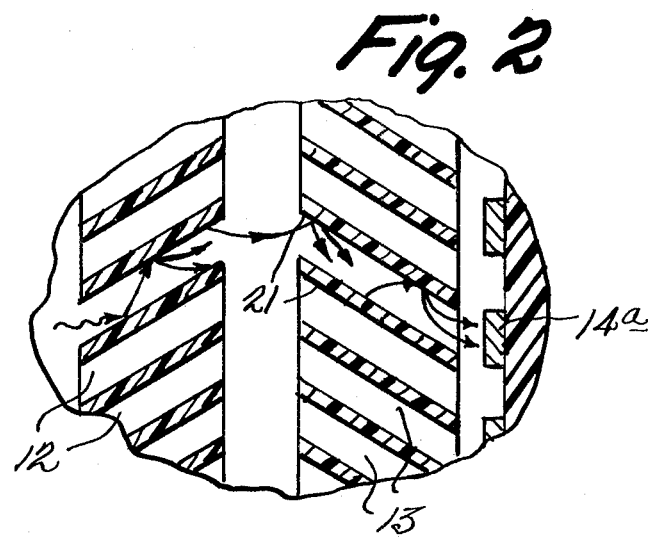
FIG. 2 is an enlarged view of a portion of the array of FIG. 1 illustrating one microchannel and its electron multiplication.

Turning now to FIGS. 1 and 2, there is shown a cross section of a detector array in accordance with this invention. The array includes a suitable supporting structure such as frame 11 which mounts first and second microchannel array plates 12 and 13 and an anode array 14. A plurality of insulating members 15 mounts the microchannel array plates and anode array in a spaced relationship with each other. Electrical contact to the detector array is made through cathode 16, intermediate bias electrodes 17, 18 and 19, and anode connection 20. A large accelerating potential, i.e. greater than 2 KV is applied between the cathode 16 and anode connection 20. As discussed hereafter, biasing potentials on the order of hundreds of volts can be applied to the biasing potential electrodes 17, 18 and 19 to reduce charge spreading.

FIG. 2 illustrates the operation of the detector array. The microchannel array plates 12 and 13 each include a plurality of microchannels, with only one operating channel for each array plate being shown in FIG. 2. As illustrated, the microchannels in the array plates are at bias angles with respect to the faces of the plates, forming a chevron configuration. Such a configuration has been described in the prior art (U.S. Pat. No. 3,374,380). The purpose of such a configuration is to permit operation of the microchannel array at a high voltage so as to obtain a high gain and saturated output pulse-height distribution, while at the same time minimizing ion feedback. That is, positive ions are trapped at the interface between the two plates so as to prevent feedback instabilities. As an example, the microchannels in plates 12 and 13 are straight and are set at bias angles with respect to each other at say 12° to the face of the plate. In the example of FIG. 1 the detector array is illustrated as comprising two cascaded microchannel array plates. Alternatively, three or more microchannel array plates may be provided in cascade, and the performance considerations governing the choice of the number of plates will be considered hereafter.

Suitable microchannel array plates are known in the art, with several different kinds being commercially available. For example, a Galileo model BX3040 which has 38 $\mu$m channels on 50 $\mu$m centers is available from Galileo Electro-Optics, Galileo Park, Sturbridge, Mass.; a Mullard model G40-25 which has 40 $\mu$m channels on 50 $\mu$m centers is available from Mullard Ltd., Torrington Place, London W.C.1, England; and an ITT model 115 which has 11 $\mu$m channels on 14 $\mu$m centers is available from ITT Electro-Optical Products Division, Roanoke, Virginia. Operation of such microchannel array plates as electron multipliers is known, and is schematically illustrated in FIG. 2. The walls 21 of the microchannels have a semiconducting coating so that they emit secondary electrons when struck by a photon. The emitted electrons are propagated through the microchannels from cathode to anode by the biasing potentials applied therebetween with continued electron multiplication providing a high gain. The anode array 14 comprises a plurality of discrete anode elements 14a which are in proximity focus to the output of the last microchannel array.

Figure 3:
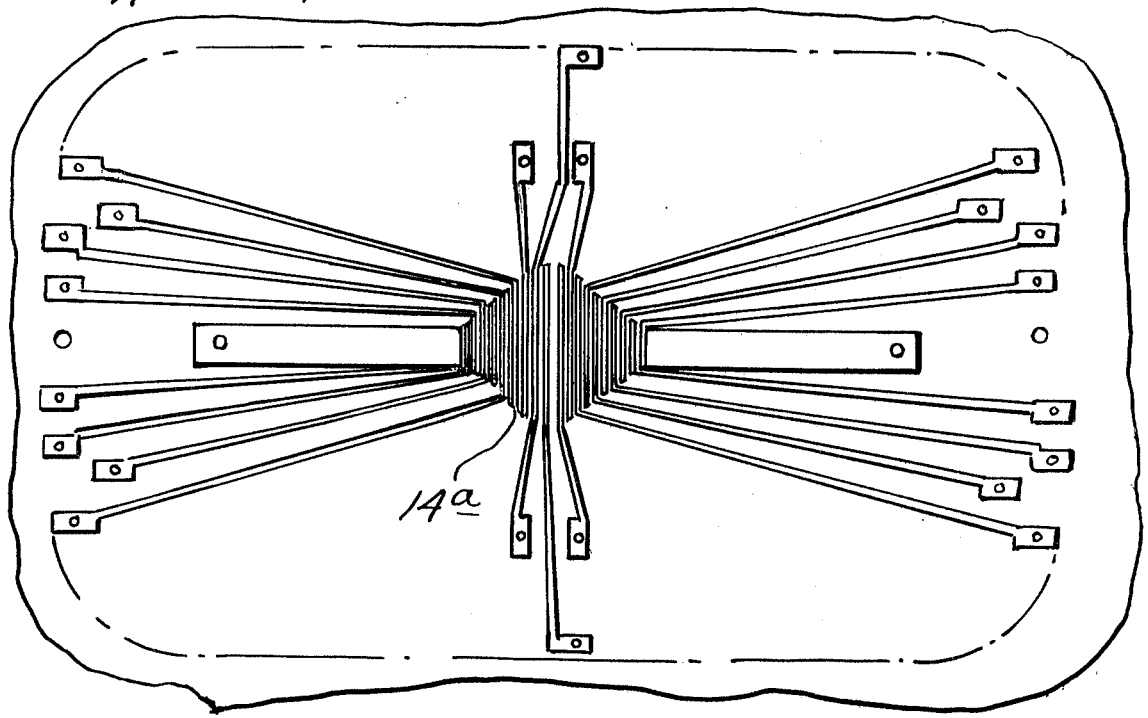
FIG. 3 is a top plan view of the anode array of FIGS. 1 and 2.

FIG. 3 is a top plan view of the anode array 14. In accordance with the invention the anode array is a one-dimensional array but has a plurality of elements 14a. In accordance with a specific embodiment of the invention, the anode array was fabricated to have sixty four individual elements. Of course, more or less individual elements may be provided, depending upon the spatial resolution desired. For example, a 256 element anode array may be provided. The specific anode array shown in FIG. 3 can be produced by photoreduction on a ceramic substrate, with each of the sixty four linear anode elements 14a having exemplary dimensions of 1.3mm in length, 25 $\mu$m in width, and set on 50 $\mu$m centers. The capacitance between adjacent anode elements should be kept low so as to minimize charge coupling. Further, the anode array should be kept flat so that it may be positioned closely to the output microchannel array plate. In a specific embodiment, the anode array 14 was flat to better than 2.5 $\mu$m, allowing separations on the order of 25 $\mu$m to be used between the array and the output of the microchannel array plate.

Figure 4:
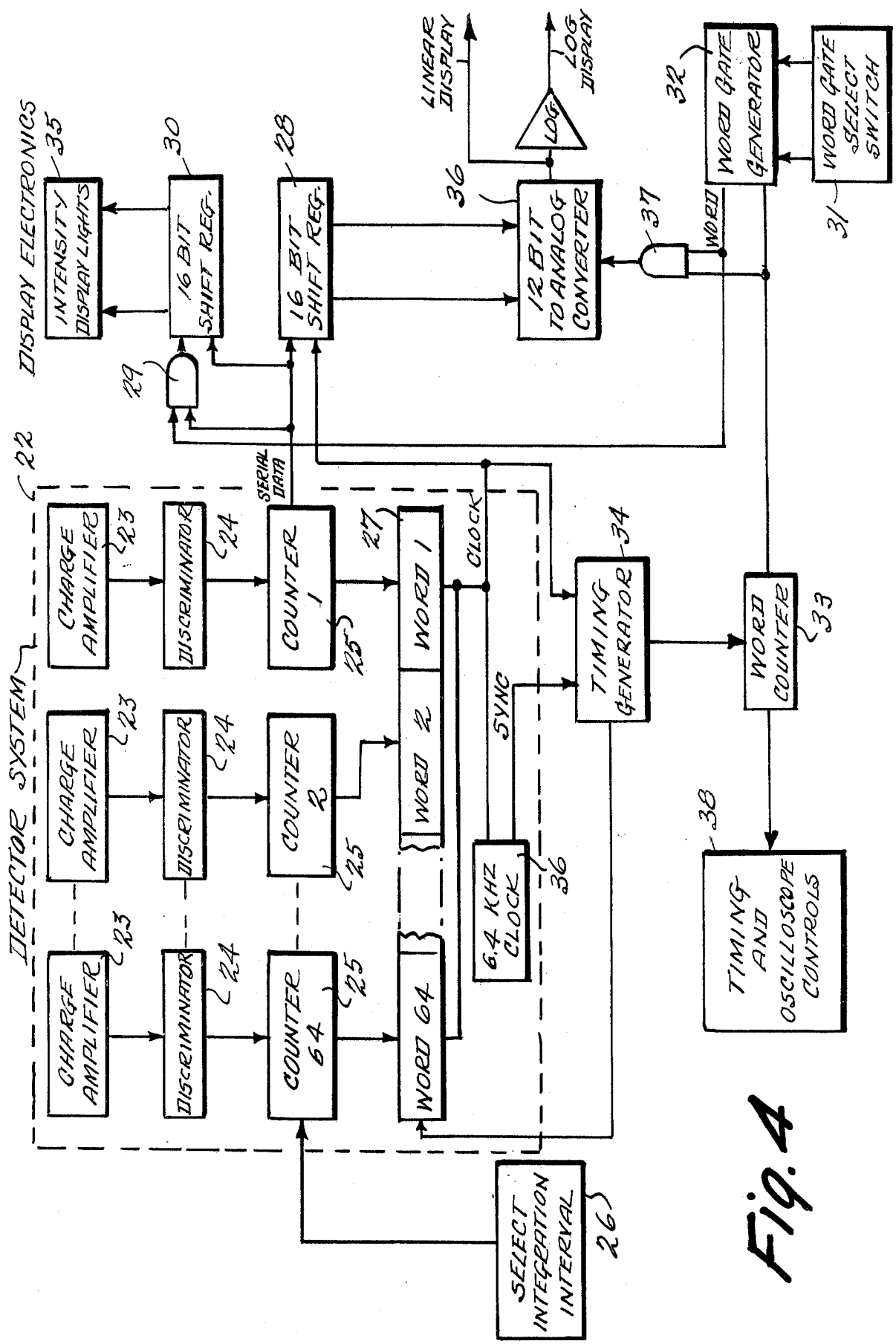
FIG. 4 is a block circuit diagram of the detector system and display electronics.

FIG. 4 is a block circuit diagram of a suitable detector system and display electronics for use with the detector array of FIG 1. A detector system 22 comprises a separate charge amplifier 23 and discriminator 24 for each of the plurality of anode elements 14a. The purpose of the discriminators is to eliminate any erroneous output indications caused by noise pulses which are due to cross coupling between adjacent electrodes in the anode array. Thus, a specific embodiment has 64 charge amplifiers 23 and 64 corresponding discriminators, one for each of the anode elements. Suitable specific circuits for the charge amplifiers and discriminators are known, and one example of suitable specific circuits is set forth in "One-dimensional photon-counting detector array for use at EUV and soft x-ray wavelengths", by J. G. Timothy and R. L. Bybee, Applied Optics, Vol. 14 pages 1632-1644, July 1975, hereby incorporated by reference. The amplifiers 23 integrate and amplify the charges on their respective anode elements and may, for example, provide an output pulse on the order of one volt where the input charge to the anode is on the order of $10^{-12}$C. Each of the discriminators 24 are in accordance with a preferred embodiment a level discriminator and one-shot multivibrator circuit which generates a logic pulse compatible with the data handling circuits provided. For example, one embodiment of discriminator generated a 10 volt logic pulse, 300 nsec in width. Preferably, the discriminator threshold is adjustable, a typical adjustment range being $8 \times 10^{-13}$C ($5 \times 10^6$ electrons/pulse) to $1.1 \times 10^{-11}$C ($7 \times 10^7$ electrons/pulse).

The digital data from each of the plurality of discriminators is accumulated in a counter 25. In accordance with a preferred embodiment of the invention, the integration interval during which counters 25 accumulate a count corresponding to pulse outputs from the discriminators is adjustable by a select integration interval circuit 26. A typical adjustment range may extend between 0.32-164 seconds. At the end of the selected integration interval the accumulated pulse counts in all 64 counters are loaded into a 64 word shift register 27. The counter data in the 64 word shift register 27 is read out as a 16-bit serial word to a 16-bit shift registers 28 and through an AND gate 29 to another 16-bit shift register 30. A clock 36 is provided to provide clock and sync signals for all the electronics. A word gate select switch 31 is provided to select any of the sixty four words for display. A word gate generator 32 under control of the word gate select switch 31 and word counter 33 generates a SELECT WORD signal which is also an input to AND gate 29. Upon the occurrence of the selected word in the serial output data of shift register 27 as sensed by word counter 33 under control of timing generator 34, the 16-bit shift register 30 shifts that word to a set of binary-coded intensity display lights 35. The intensity display lights 35 thus present the charge intensity from any selected one of the sixty four anode elements.

The shift register 28 transfers the serial output data to a 12-bit digital-to-analog converter 36, which also receives a load command signal from an AND gate 37. The output of digital-to-analog converter 36 can be displayed in linear or logarithmic format on an oscilloscope or recorded on an analog plotter. There being provided suitable timing and oscilloscope controls 38, the accumulated counts recorded by all sixty-four amplifiers can be presently simultaneously in analog format, while the intensity level from any selected amplifier is presented on the intensity display lights.

In experiments with microchannel array detectors constructed in accordance with this invention, and described more fully in the Applied Optics Vol. 14, July 1975 article referred to above, several conclusions regarding the parameters for a successful detector system for use over a wavelength range of 20 A to 1400 A have evolved.

Charge spreading at the interface between the microchannel array plates can produce a tail of large amplitude pulses in the output. Each microchannel in the second or innermost microchannel array plate acts as an individual multiplier, so that the effect of charge spreading from one microchannel in the first plate to two or three or more microchannels in the second plate is to broaden the pulse height distribution, rather than to increase the modal gain value of a saturated distribution. It has been found that this charge spreading can be reduced by two means. First, applying a bias potential of several hundred volts between the microchannel array plates through the bias potential electrodes 17, 18 and 19 is effective to reduce the charge spreading. Secondly, the charge spreading is quite effectively controlled if, additionally or alternatively, the separation of the microchannel array plates is reduced to a distance smaller than the diameter of the individual microchannels. In fact, successful detector arrays have been constructed with three microchannel array plates having their adjacent faces in direct contact, i.e. a spacing of zero.

There is also the problem of charge spreading at the output of the innermost microchannel array plate due to the output electrons from the array plate being repelled by the negative space charge on the insulating substrate of the anode array, and the diameter of the microchannels being comparable to the width of an individual anode element. It has been found that this problem can be solved by keeping the distance between the innermost microchannel array plate and the anode array to the same order of magnitude of (or less than) the diameter of the microchannels. Additionally, a bias potential in the range of 120-150 volt range between the bias potential electrode 19 and the anode elements 14a also contributes to overcoming this problem.

Although the invention has been described with reference to certain specific embodiments, various design changes and modifications may be made by those skilled in this art without departing from the true spirit and scope of this invention.

I claim:

1. A one-dimensional photon-counting detector for operation at extreme ultraviolet and soft X-ray wavelengths comprising at least one microchannel array plate configured to minimize ion feedback, an anode array comprising a plurality of separate anode elements disposed in a plane parallel and adjacent to but spaced a predetermined distance on the order of 25 $\mu$m from the innermost face of said at least one microchannel array plate, amplifier and discriminator means connected to each anode element for developing output pulses indicative of a charge packet accumulated by the anode element, integration means for accumulating a count representative of the number of output pulses from each anode element during a selected predetermined time interval, and data readout means for reading out the count of output pulses for each anode element.

2. A one-dimensional photon-counting detector in accordance with claim 1 wherein the predetermined distance between said anode elements and said innermost microchannel array plate is selected to be proportional to the required spatial resolution of the detector.

3. A one-dimensional photon-counting detector in accordance with claim 1 wherein more than one adjacent microchannel array plates are provided and are spaced from each other by a distance less than approximately 25 $\mu$m.

4. A one-dimensional photon-counting detector in accordance with claim 1 where more than one microchannel plates are provided and including biasing potential electrodes contacting adjacent microchannel array plates for establishing a biasing potential therebetween to minimize charge spreading effects.

5. A one-dimensional photon-counting detector array in accordance with claim 1 including biasing potential electrodes contacting the innermost face of said microchannel array plate for establishing a biasing potential between said plate and said anode elements.

* * * * *